United States Patent [19]

Kotani et al.

[11] Patent Number: 5,132,149
[45] Date of Patent: Jul. 21, 1992

[54] BARRIER PACKAGING MATERIAL FOR INFUSION SOLUTION

[75] Inventors: Takayuki Kotani, Iruma; Takeshi Inuzuka, Tokyo, both of Japan

[73] Assignee: Kabushiki Kaisha Hosokawa Yoko, Japan

[21] Appl. No.: 635,667

[22] Filed: Dec. 28, 1990

[30] Foreign Application Priority Data

Oct. 9, 1990 [JP] Japan ................. 2-270718

[51] Int. Cl.$^5$ ............................. B29D 22/00
[52] U.S. Cl. ...................... 428/36.7; 428/35.4; 428/349; 428/213; 428/516
[58] Field of Search ............ 428/349, 516, 35.4, 428/36.6, 36.7

[56] References Cited

FOREIGN PATENT DOCUMENTS 243510 11/1987 European Pat. Off. .

*Primary Examiner*—Edith L. Buffalow
*Attorney, Agent, or Firm*—Ladas & Parry

[57] ABSTRACT

A barrier packaging material for an infusion solution including an intermediate layer including an ethylene-vinyl alcohol copolymer, and co-extrusion layers including an ethylene-vinyl acetate copolymer which have respectively been dry-laminated on both sides of the intermediate layer, wherein the ethylene-vinyl acetate co-extrusion layer includes a middle layer having a vinyl acetate content of 15 to 25 wt. %, and an upper layer and a lower layer each having a vinyl acetate content of 5 to 9 wt. % respectively disposed on both sides of the middle layer.

4 Claims, 1 Drawing Sheet

BARRIER PACKAGING MATERIAL FOR INFUSION SOLUTION

FIELD OF THE INVENTION AND RELATED ART

The present invention relates to a packaging material to be used for an infusion solution bag, etc., more specifically to a packaging material for an infusion solution which has been improved in the barrier property thereof.

Hitherto, as the packaging materials for infusion solutions, those having a thickness of about 250 to 350 μm and comprising a single layer of polyvinyl chloride (PVC), ethylene-vinyl acetate copolymer (EVA), and polyethylene (PE) have been used. These materials ordinarily have the following oxygen permeability:

OXYGEN PERMEABILITY

Values Corresponding to a Film Having a Thickness of 300 μm

PVC: 40 to 50 cc/m$^2$·24hrs.
EVA: 180 to 200 cc/m$^2$·24hrs.
PE: 180 to 200 cc/m$^2$·24hrs.
(measurement condition: 25° C., 65% RH)

Among the packaging materials as described above, PVC has been used in many cases because it has a relatively good barrier property.

However, various problems have been posed in the prior art. More specifically, a better barrier property has been desired in the case of a certain kind of an infusion solution. Since a softness is imparted to PVC by adding thereto a plasticizer as an additive, it is possible that the additive component contained in the PVC is dissolved into the infusion solution. Further, an acidic gas (chlorine gas) produced by the incineration of PVC is liable to cause environmental pollution.

As the EVA, one having a relatively high vinyl acetate (VA) content (e.g., about 15 to 20%) has generally been used in view of its softness. Further, as the PE, one having a low density (i.e., LDPE), linear polyethylene (i.e., L-LDPE), etc., have generally been used. However, these materials are not sufficient in view of the above-mentioned barrier property to oxygen gas.

On the other hand, we have attempted dry laminating on an ethylene-polyvinyl alcohol copolymer (EVOH) by using an EVA film (VA content: 15 to 20%). In such a case, however, blocking was liable to occur on the basis of corona treatment on EVA, and the resultant slip property was liable to be insufficient at the time of winding-up of a product film, whereby some problems occurred in the conversion or processing of the resultant film.

SUMMARY OF THE INVENTION

An object of the present invention is to provide a packaging material for an infusion solution which is capable of broadening the scope of materials or contents to be contained therein, by improving its barrier property.

Another object of the present invention is to provide a packaging material for an infusion solution which does not produce a poisonous gas at the time of the incineration thereof.

A further object of the present invention is to provide a packaging material for an infusion solution which as been improved in its softness, slip property, etc.

According to the present invention, there is provided a barrier packaging material for an infusion solution comprising: an intermediate layer comprising an ethylene-vinyl alcohol copolymer, and co-extrusion layers comprising an ethylene-vinyl acetate copolymer which have respectively been dry-laminated on both sides of the intermediate layer; wherein the ethylene-vinyl acetate co-extrusion layer comprises a middle layer having a vinyl acetate content of 15 to 25 wt. %, and an upper layer and a lower layer each having a vinyl acetate content of 5 to 9 wt. % respectively disposed on both sides of the middle layer.

When there is used the packaging material for an infusion solution according to the present invention which has the above-mentioned structure and composition, an excellent barrier property may easily be attained on the basis of the use of the ethylene-polyvinyl alcohol copolymer.

In the above-mentioned film structure according to the present invention, an ethylene-vinyl alcohol copolymer (EVOH) is provided in the central portion and an ehtylene-vinyl acetate copolymer is provided on both sides thereof, whereby the hardness of the EVOH is lightened or compensated in the above-mentioned structure.

There and other objects, features and advantages of the present invention will become more apparent upon a consideration of the following description of the preferred embodiments of the present invention.

DETAILED DESCRIPTION OF PREFERRED EMBODIMENTS

Figure 1:
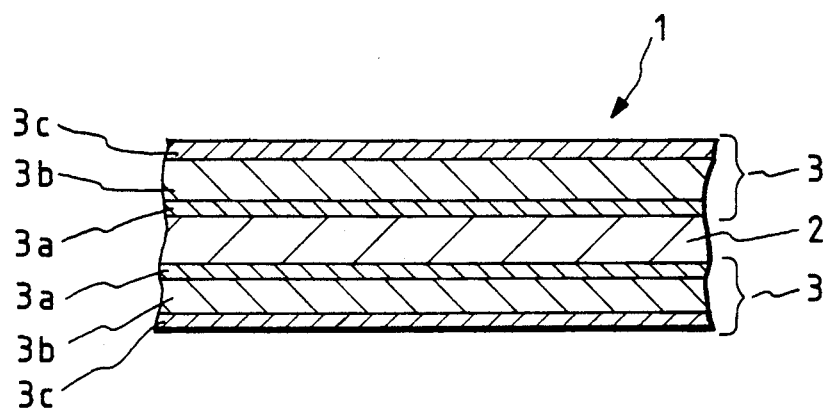
FIG. 1 is schematic sectional view showing an embodiment of the packaging material according to the present invention.

Hereinbelow, the present invention is specifically described with referred embodiments thereof.

FIG. 1 is a schematic sectional view showing an embodiment of the packaging material according to the present invention. Referring to FIG. 1, the packaging material 1 comprises an intermediate layer 2 comprising an ethylene-vinyl alcohol copolymer (EVOH), and a pair of co-extrusion ethylene-vinyl acetate copolymer (EVA) layers 3 which have been dry-laminated on both sides of the intermediate layer 2.

The above-mentioned EVOH layer 2 may preferably comprise a biaxially oriented film, and may preferably have a thickness of 5 to 30 μm. If the thickness of the EVOH layer 2 is below 5 μm, a sufficient barrier property cannot be attained. If the thickness of the EVOH layer 2 exceeds 30 μm, the softness of the resultant packaging material 1 for infusion solution undesirably becomes insufficient.

On the other hand, the EVA co-extrusion film 3 to be dry-laminated on the above-mentioned intermediate layer 2 is not a single layer but comprises three species of EVA layers 3a, 3b, 3c wherein the vinyl acetate (VA) contents are changed in a predetermined manner. More specifically, the three-layer structure comprise a middle layer 3b having a VA content of 15 to 25 wt. %, and an upper layer 3a and a lower layer 3c having a VA content of 5 to 9 wt. % respectively disposed on the both sides of the middle layer 3b.

In the present invention, since the EV contents in the EVA layers respectively constituting the upper layer 3a and lower layer 3c are low, the resultant packaging material 1 for infusion solution is caused to have a good slip property and a good anti-blocking property. Accordingly, embossing treatment which has heretofore been conducted is not necessarily required and the resultant clarity is improved. As a result, it becomes easier to confirm whether a foreign matter is mixed in the fusion solution to be contained in the packaging material, before and after the packing of the infusion solution.

In the above-mentioned EVA layer 3, the middle layer 3b having a VA content of 15 to 25 wt. % may preferably have a thickness which is ½ times or more the total thickness of the co-extrusion EVA layer 3. The upper layer 3a and lower layer 3c having a VA content of 5 to 9 wt. % to be disposed on both sides of the middle layer 3b may preferably have a thickness of 5 to 50 μm, respectively. The total thickness of the EVA layer 3 may preferably be 100–200 μm. When the thickness of the middle EVA layer 3b corresponds to at least ½ of the thickness of the co-extrusion EVA layer 3, the co-extrusion EVA layer 3 becomes softer and a softness is imparted to the whole packaging material 1.

Hereinbelow, the present invention is described in more detail with reference to Experiment Example.

EXPERIMENT EXAMPLE

Two EVA co-extrusion film having a thickness of about 140 μm were dry-laminated on both sides of a 15 μm-thick biaxially oriented EVOH film (Eval XL #15, mfd. by Kuraray K.K.), whereby a packaging material (thickness: about 300 μm) for infusion solution according to the present invention was prepared. The above-mentioned EVA co-extrusion film had been prepared so that the resultant film comprised a lower layer having a VA content of 7 wt. %, a middle layer having a VA content of 20 wt. %, and an upper layer having a VA content of 7 wt. %. Each of the upper and lower layers had a thickness of 35 μm, and the middle layer had a thickness of 70 μm.

For the purpose of comparison, there were prepared three species of packaging materials for an infusion solution having a thickness of about 300 μm, each of which comprised a single layer of polyvinyl chloride (PVC), EVA or PE.

With respect to the above-mentioned respective packaging materials for infusion solution, oxygen permeabilities were measured. The results are shown in the following Table 1.

TABLE 1

| Packaging material for infusion solution | Oxygen permeability (cc/m² · 24 hrs) |
|---|---|
| Product according to the present invention | 1 to 2 |
| PVC single layer | 45 |
| EVA single layer | 190 |
| PE single layer | 185 |

(measurement condition: 25° C., 65% RH)

As shown in the above Table 1, the product according to the present invention showed a very low oxygen permeability, as compared with the conventional packaging materials for infusion solution.

Further, the packaging material for infusion solution according to the present invention showed a good slip property at the time of processing (dry laminating) thereof and it could be processed without being wrinkled.

As described hereinabove, when the packaging material for an infusion solution having the above-mentioned structure is used, the resultant oxygen permeability is reduced and an excellent barrier property may be attained, whereby good storability may be attained with respect to the infusion solution to be contained in the packaging material.

The packaging material according to the present invention may be applied to any type of infusion solution without particular limitation (i.e., the packaging material according to the present invention is applicable to a wider scope of various kinds of infusion solutions).

In the prior art, the packaging material comprising PVC alone or that using poyvinylidene chloride (PVDC) as a barrier material produces chlorine gas at the time of the incineration thereof. On the other hand, the packaging material according to the present invention does not produce chlorine gas at the time of incineration thereof, and is excellent in environmental protection property.

Further, since the packaging material uses co-extrusion EVA, good effects may be attained as follows.

A) Since the outer layer constituting the co-extrusion EVA layer comprises an EVA having a VA content of 5 to 9%, the resultant product is excellent in slip property and anti-blocking property. Accordingly, the resultant product is not necessarily required to be subjected to embossing treatment. In an embodiment wherein the embossing treatment is omitted, the resultant clarity is improved. As a result, it becomes easier to confirm whether a foreign matter is mixed in the fusion solution to be contained in the packaging material, before and after the packing of the infusion solution.

B) In an embodiment wherein the middle layer (VA content: 15 to 25 wt. %) constituting the co-extrusion EVA layer is caused to have a thickness which is ½ times or more the total thickness of the EVA layer, the resultant packaging material may have a better softness.

Further, in the present invention, the amount and/or kind of additives to be added to the co-extrusion EVA layer and EVOH layer can be minimized, whereby dissolution of such an additive to the content contained in the packaging material is suppressed and great safely may be attained. Further, since the packaging material uses EVOH as a barrier layer, it causes no browning at the time of sterilization using γ-ray, unlike a case wherein vinylidene chloride (PVDE) is used.

What is claimed is:

1. A barrier packaging material for an infusion solution comprising: an intermediate layer comprising an ethylene-vinyl alcohol copolymer; and co-extrusion layers comprising an ethylene-vinyl acetate copolymer which have respectively been dry-laminated on both sides of the intermediate layer;

wherein the ethylene-vinyl acetate co-extrusion layer comprises a middle layer having a vinyl acetate content of 15 to 25 wt. %, and an upper layer and a lower layer each having a vinyl acetate content of 5 to 9 wt. % respectively disposed on both sides of the middle layer, the ethylene-vinyl acetate co-extrusion layer has a thickness of 100 to 200 μm, and the upper layer and the lower layer each has a thickness of 5 to 50 μm.

2. A barrier packaging material according to claim 1, wherein the intermediate layer comprises a biaxially oriented film.

3. A barrier packaging material according to claim 1, wherein the intermediate layer has a thickness of 5 to 30 μm.

4. A barrier packaging material according to claim 1, wherein the middle layer has a thickness which is ½ times or more the total thickness of the ethylene-vinyl acetate co-extrusion layer.

* * * * *